(12) United States Patent
McFarland et al.

(10) Patent No.: US 11,162,403 B2
(45) Date of Patent: Nov. 2, 2021

(54) REDUCTANT DOSING UNIT WITH FLOW VARIABILITY REDUCTION AND PURGE IMPROVEMENT DEVICE

(71) Applicant: Continental Automotive Systems, Inc., Auburn Hills, MI (US)

(72) Inventors: Robert Wayne McFarland, Smithfield, VA (US); Keith Aaron Shaw, Yorktown, VA (US); Christopher Michael Caulkins, Virginia Beach, VA (US)

(73) Assignee: Vitesco Techologies USA, LLC, Auburn Hills, MI (US)

( * ) Notice: Subject to any disclaimer, the term of this patent is extended or adjusted under 35 U.S.C. 154(b) by 179 days.

(21) Appl. No.: 16/215,068

(22) Filed: Dec. 10, 2018

(65) Prior Publication Data

US 2019/0186319 A1 Jun. 20, 2019

Related U.S. Application Data

(60) Provisional application No. 62/598,434, filed on Dec. 13, 2017.

(51) Int. Cl.
*F01N 3/20* (2006.01)

(52) U.S. Cl.
CPC ........... *F01N 3/208* (2013.01); *F01N 3/2066* (2013.01); *F01N 2610/02* (2013.01); *F01N 2610/1453* (2013.01); *F01N 2610/1493* (2013.01)

(58) Field of Classification Search
CPC ......... F01N 2610/02; F01N 2610/1453; F01N 2610/1493; F01N 3/2066; F01N 3/208; Y02T 10/12
See application file for complete search history.

(56) References Cited

U.S. PATENT DOCUMENTS 4,711,397 A * 12/1987 Lahiff ................... F02M 51/065
239/125
6,135,094 A * 10/2000 Okada ..................... F02M 37/48
123/470

(Continued)

FOREIGN PATENT DOCUMENTS

CN 202659913 U 1/2013
CN 103620174 A 3/2014

(Continued)

OTHER PUBLICATIONS

Japanese Notification of Reasons for Refusal dated Nov. 5, 2019, for corresponding Japanese Pat. Appl. No. 2018-232759.

(Continued)

*Primary Examiner* — Jesse S Bogue

(57) ABSTRACT

A dosing unit having a fluid path defined therethrough and including a fluid injector having an inlet tube; an inlet cup sized and shaped for receiving therein at least part of the inlet tube of the fluid injector, the inlet cup including a fluid inlet; an input tube in fluid communication with the inlet cup via the fluid inlet thereof, the input tube configured to receive fluid from a fluid source; and an insert partly disposed in the inlet tube of the fluid injector, the insert at least partly defining a fluid passage. The fluid passage is in fluid communication with the input tube and the inlet tube of the fluid injector and forms part of the fluid path of the dosing unit. The fluid passage includes a portion extending in a direction that is orthogonal to a longitudinal axis of the fluid injector.

20 Claims, 8 Drawing Sheets

(56) References Cited

U.S. PATENT DOCUMENTS

| | | | |
|---|---|---|---|
| 7,431,226 B2* | 10/2008 | Cho | F02M 51/0682 239/533.2 |
| 10,598,139 B2* | 3/2020 | Pyle | F23D 11/26 |
| 2004/0101450 A1 | 5/2004 | Mayer | |
| 2004/0262333 A1 | 12/2004 | Huber et al. | |
| 2005/0269426 A1* | 12/2005 | Cho | F02M 51/0682 239/533.2 |
| 2013/0228231 A1* | 9/2013 | Nagel | F02M 53/043 137/334 |
| 2014/0054394 A1* | 2/2014 | Bugos | F01N 3/10 239/132.3 |
| 2014/0075923 A1 | 3/2014 | Hodgson et al. | |
| 2014/0138568 A1* | 5/2014 | van Vuuren | F16K 27/00 251/357 |
| 2015/0059322 A1* | 3/2015 | Bugos | F01N 3/208 60/298 |

FOREIGN PATENT DOCUMENTS

| | | |
|---|---|---|
| CN | 104321164 A | 1/2015 |
| DE | 102017105420 A1 | 9/2017 |
| EP | 2221459 A1 | 8/2010 |
| JP | H08193554 A | 7/1996 |
| JP | H10227270 A | 8/1998 |
| JP | 2000220552 A | 8/2000 |
| JP | 2014519572 A | 8/2014 |
| KR | 101503206 B1 | 3/2015 |
| WO | 0213951 A1 | 2/2002 |
| WO | 0242616 A1 | 5/2002 |
| WO | 2008151908 A1 | 12/2008 |
| WO | 2012049175 A1 | 4/2012 |
| WO | 2012159986 A1 | 11/2012 |

OTHER PUBLICATIONS

European Search Report dated Mar. 13, 2019 for corresponding European Patent Application No. 18212225.9.
Korean Intellectual Property Office Notice to Submit Response dated Aug. 20, 2020 for the counterpart Korean Patent Application No. 10-2018-0160400.
National Intellectual Property Administration, P. R. China First Office Action dated Jul. 24, 2020 for the counterpart Chinese Patent Application No. 201811527988.1.
Japanese Decision to Grant a Patent dated May 7, 2020 dated Nov. 5, 2019, for corresponding Japanese Pat. Appl. No. 2018-232759.

* cited by examiner

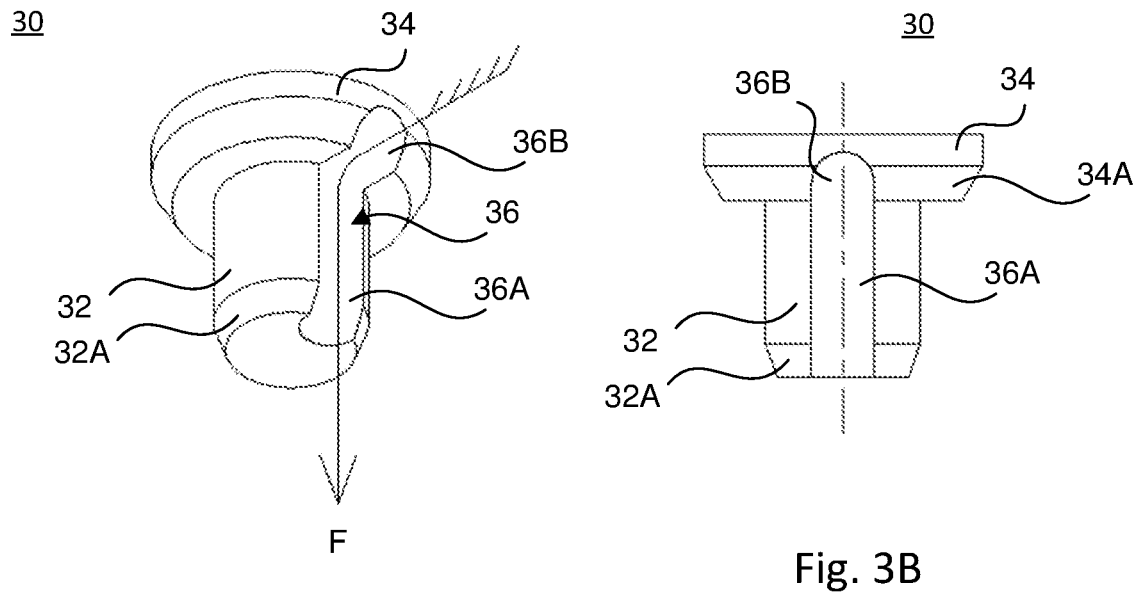
Fig. 3A
Fig. 3B
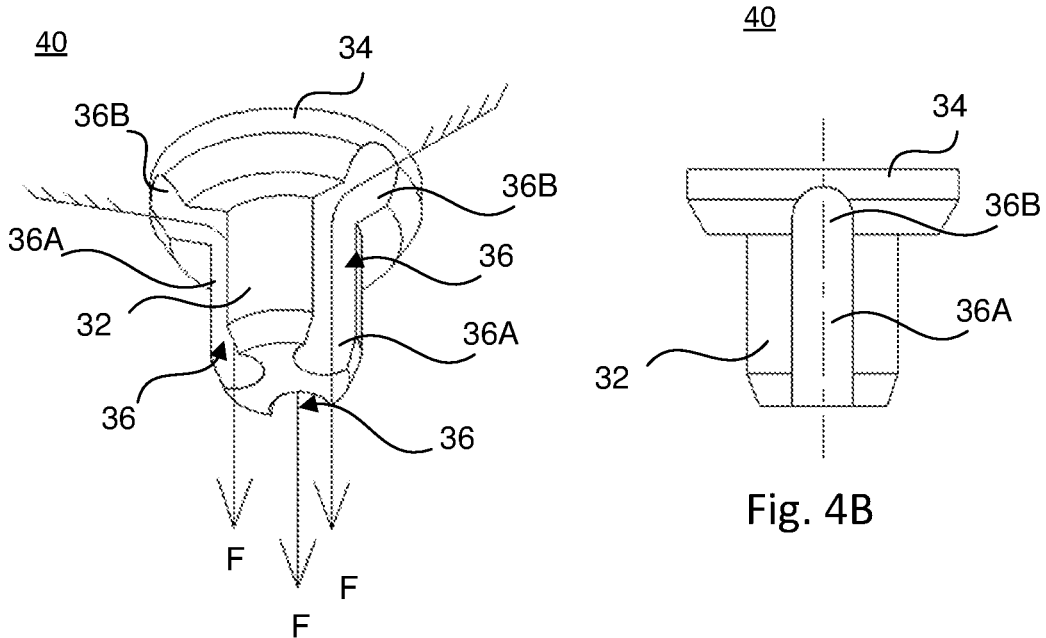
Fig. 4A
Fig. 4B

REDUCTANT DOSING UNIT WITH FLOW VARIABILITY REDUCTION AND PURGE IMPROVEMENT DEVICE

FIELD OF THE INVENTION

The present invention relates generally to a reductant dosing unit (RDU) and particularly to an RDU insert which reduces flow variability and increases reductant purge capability.

BACKGROUND

Diesel Exhaust Fluid (DEF) is used as a reductant in diesel engines to reduce NOx emissions. The DEF is pumped from a holding tank to an RDU via flexible hydraulic lines. The RDU has a hydraulic connection to mate with the flexible line and RDU inlet cup. The inlet cup is typically the highest point on the RDU when the RDU is attached to the exhaust pipe of a vehicle. The RDU inlet cup feeds a DEF injector in the RDU which sprays DEF into the exhaust system. FIG. 1 illustrates a conventional side-feed RDU 10 and FIG. 2 illustrates side-feed RDU 10 that is tilted 30 degrees from vertical representative of some mountings to the vehicle exhaust pipe. RDU 10 includes an input tube 12 for receiving DEF from a source thereof, and an inlet cup 14 coupled to and in fluid communication with input tube 12. RDU 10 further includes a housing 16 in which an injector 18 is disposed. Among other things, housing 16 provides thermal protection to injector 18. Injector 18 includes an inlet tube 20 having an upstream end, relative to the flow of DEF through RDU 10 and injector 18, which is disposed within inlet cup 14 and is in fluid communication with input tube 12 for receiving DEF therefrom. Injector 18 also includes a nozzle 22 disposed at a downstream end thereof. A mounting flange 24 allows for mounting RDU 10 to the exhaust pipe of a vehicle (not shown). RDU 10 may be a passive (air) cooled RDU or an active (liquid) cooled RDU.

Due to the geometry of the inlet cup to injector transition, there is the likelihood that an air bubble or pocket forms and remains at the highest point of RDU 10. FIG. 2 illustrates an air bubble formed in the highest point in RDU 10. This air bubble is compressible which can cause system flow variations, especially in multiple dosing unit systems. Flow variations reduce the system's ability to dose the correct amount of DEF, which adversely affects NOx conversion performance.

Air is introduced into some conventional RDU SCR systems at least partly because the system purges the RDU injector of DEF at engine shut off and replaces it with air. Purging RDU 10 of DEF is required in these systems because DEF freezes at −11 degrees C. and expands as it freezes. Without purging, DEF expansion can damage the injector 18.

BRIEF DESCRIPTION OF THE DRAWINGS

The present invention will become more fully understood from the detailed description and the accompanying drawings, wherein:

FIGS. 3A and 3B illustrate perspective and cross sectional views, respectively, of an RDU insert according to an example embodiment;

FIGS. 4A and 4B illustrate perspective and cross sectional views, respectively, of an RDU insert according to another example embodiment;

DETAILED DESCRIPTION

Figure 1:
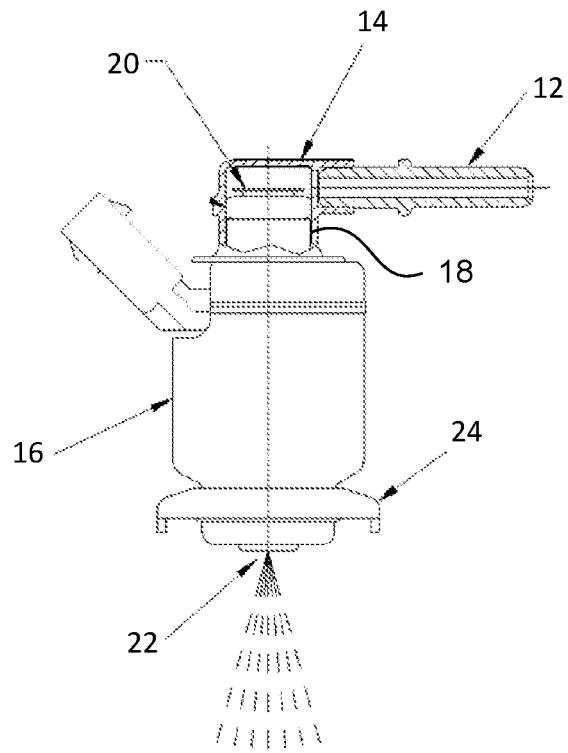
FIG. 1 is a partial cross-sectional side view of a conventional RDU.
Figure 2:
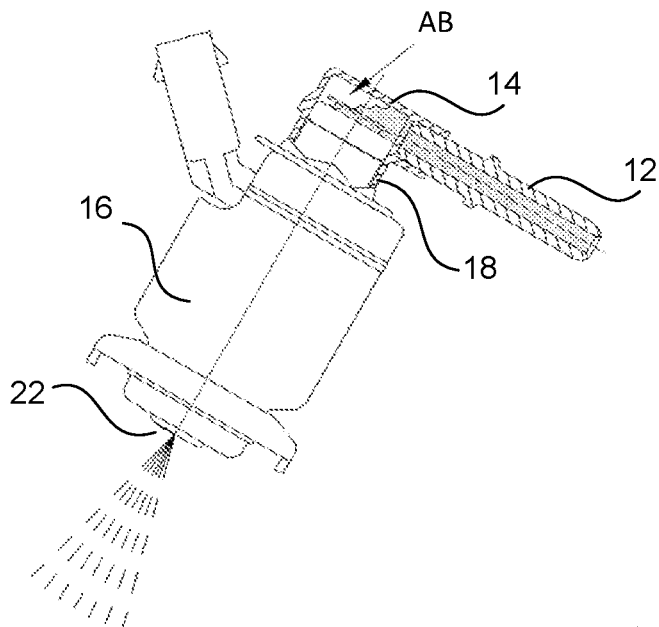
FIG. 2 is a partial cross sectional side view of the RDU of FIG. 1 disposed at a 30 degree angle, representing a mounting angle of the RDU when mounted to a vehicle exhaust pipe.

The following description of the example embodiment(s) is merely exemplary in nature and is in no way intended to limit the invention, its application, or uses. Unless otherwise specified, the terms "upstream" and "downstream" are intended to be relative to the flow of DEF through the RDU injector.

Referring now to FIGS. 3A and 3B, there is shown a RDU insert 30 according to an example embodiment. Insert 30 fits within cup 14 of an otherwise conventional RDU 10, and is sized and dimensioned to fit at least partly in the upstream end of inlet tube 20 of conventional RDU injector 18. A portion of insert 30 extends in an upstream direction from inlet tube 20. As such, insert 30 occupies space within cup 14 of RDU 10 which would otherwise be occupied by DEF and/or one or more air bubbles. With less space available for DEF and/or air bubbles, there is less DEF needing to be purged during a purge operation, and less air in RDU 10 which may adversely affect DEF dosing operations and particularly flow variability thereof.

As shown in FIGS. 3A and 3B, insert 30 includes a first portion 32 configured to at least partly fit within inlet tube 20 of RDU injector 18. With inlet tube 20 being largely cylindrically shaped, first portion 32 is similarly largely cylindrically shaped. A downstream end 32A of first portion 32 may be tapered radially inwardly relative to the outer surface of the rest of first portion 32, to allow for insertion of first portion 32 within inlet tube 20. A second portion 34 of insert 30 is attached to the upstream end of first portion 32. As illustrated, second portion 34 extends in a radial direction farther than the radial extension of first portion 32. The radial extent of second portion 34 is greater than the radial extent of inlet tube 20 of injector 18 such that second portion 34 is disposed on top of the open, upstream end of inlet tube 20. A downstream end 34A of second portion 34 may be tapered radially inwardly relative to the outer surface of the rest of second portion 34. In the present example embodiment, an upper surface of second portion 34 is flat. In the example embodiment, first portion 32 and second portion 34 are integrally formed as a unitary member.

Insert 30 further includes a groove or slot 36 defined therealong. Groove 36 is sized and dimensioned for passing DEF in cup 14, received from input tube 12 of RDU 10, into injector inlet tube 20 of injector 18. As shown in FIGS. 3A and 3B, groove 36 is defined in first portion 32 and second portion 34, with groove 36 including a first portion 36A defined in first portion 32 and a second portion 36B defined in second portion 34. In the present example embodiment, first portion 36A and second portion 36B of groove 36 are defined generally at or nearly at 90 degrees relative to each other, with first portion 36A extending in a direction of flow of DEF through injector 18 and/or parallel to a longitudinal axis thereof, and with second portion 36B extending in a direction that is orthogonal to the direction of DEF flow through injector 18, orthogonal to the longitudinal axis of fluid injector 18, and orthogonal to a direction of DEF flow exiting input tube 12. In the present embodiment, groove 36 is defined along the outer surface of first portion 32 and second portion 34. As will be shown in greater detail below, groove 36 at least partly defines a fluid passage for passing DEF in cup 14 into fluid injector 18 for selectively dosing into the vehicle's exhaust pipe. This passage forms part of a flow path for DEF through the RDU.

Referring now to FIGS. 4A and 4B, there is shown an RDU insert 40 according to another example embodiment. Insert 40 largely resembles insert 30, with first portion 32 and second portion 34. In addition, whereas insert 30 includes a single groove 36 defined in and/or along first portion 32 and second port 34, insert 40 includes a plurality of such grooves 36 defined in and/or along the outer surface of first portion 32 and second portion 34. In the present embodiment, insert 40 includes three grooves 36 disposed equidistant from each other, and it is understood that insert 40 may include two or more than three grooves 36 equally spaced from each other. Each groove 36 is defined in first portion 32 and second portion 34 of insert 40, with each groove 36 including a first portion 36A defined in first portion 32 and a second portion 36B defined in second portion 34. In the present example embodiment, first portion 36A and second portion 36B of groove 36 are defined at or near 90 degrees relative to each other. In the present embodiment, each groove 36 is defined along the outer surface of first portion 32 and second portion 34. As will be shown in greater detail below, grooves 36 at least partly define fluid passages for passing DEF in cup 14 into fluid injector 18 for selectively dosing into the vehicle's exhaust pipe. These passages form part of a flow path for DEF through the RDU.

Figure 5A:
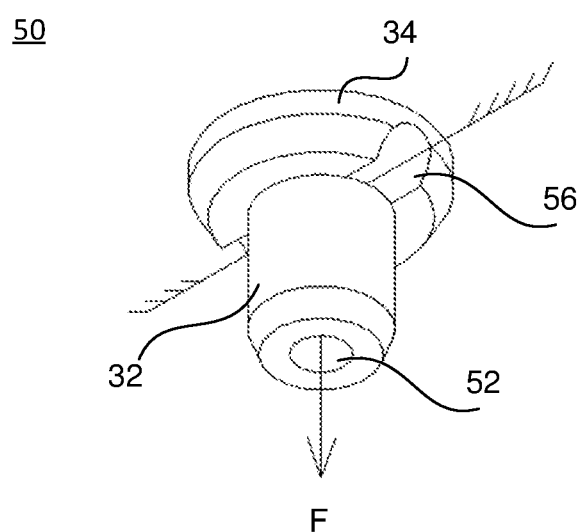
FIGS. 5A and 5B illustrate perspective and cross sectional views, respectively, of an RDU insert according to another example embodiment.
Figure 5B:
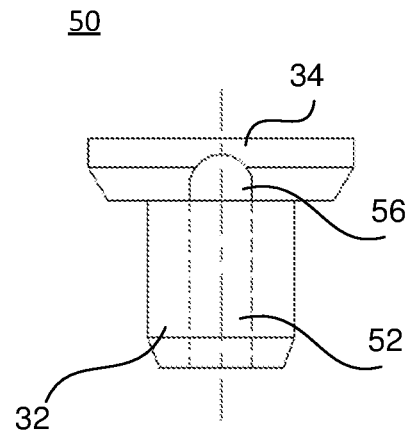

Referring now to FIGS. 5A and 5B, there is shown an RDU insert 50 according to another example embodiment. Insert 50 largely resembles inserts 30 and 40, having first portion 32 and second portion 34 as described above. However, whereas insert 40 includes second groove 36A defined along an outer surface of first portion 32, insert 50 includes a channel 52 defined within first portion 32. Channel 52 is defined through an axial center of first portion 32, from one axial end to an opposed second end of first portion 32. Channel 52 is entirely or nearly entirely defined by insert 50.

Insert 50 further includes a groove or channel 56. Specifically, groove 56 extends in a radial direction in second portion 34 from multiple locations (two, as illustrated in FIG. 5A) along the bottom outer surface of second portion 34. In this case, the two locations from which groove 56 extends are along opposed radial ends of second portion 34. In this way, channel 52 and groove 56 form a T-shaped or nearly T-shape fluid passage through insert 50 from second portion 34 to first portion 32. It is understood, though, that groove 56 may extend in a radially inwardly direction from two locations that are not at opposed outer radial ends of second portion 34, and/or may extend radially inwardly from three or more locations along the outer radial surface(s) of second portion 34.

Figure 6A:
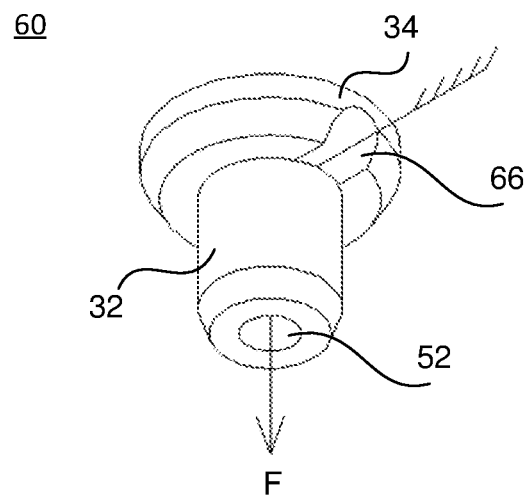
FIGS. 6A and 6B illustrate perspective and cross sectional views, respectively, of an RDU insert according to another example embodiment.
Figure 6B:
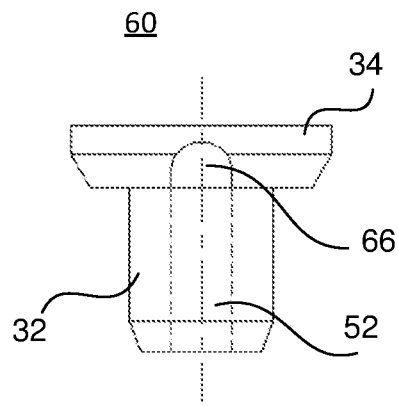

FIGS. 6A and 6B illustrate insert 60 according to another example embodiment. Insert 60 largely resembles insert 50 as described above, with first portion 32 and second portion 34. In addition, insert 60 includes channel 52 which extends between first portion 32 and second portion 34 as described above with respect to insert 50. Channel 52 extends in an axial direction through an axial center (and/or longitudinal axis) of first portion 32, from one axial end of first portion 32 to an opposed second axial end thereof. Insert 60 further includes groove or channel 66 defined in second portion 34. Whereas groove 56 extends radially inwardly from multiple locations along the bottom outer surface of second portion 34 of insert 50, groove 66 extends radially inwardly to a radial center of second portion 34 from a single location along the outer radial surface of second portion 34. In this way, channel 52 and groove 66 form an inverted L shaped fluid passage, having a first segment that extends in a radial direction within second portion 34 and a second segment that extends in an axial direction within first portion 32.

Figure 7:
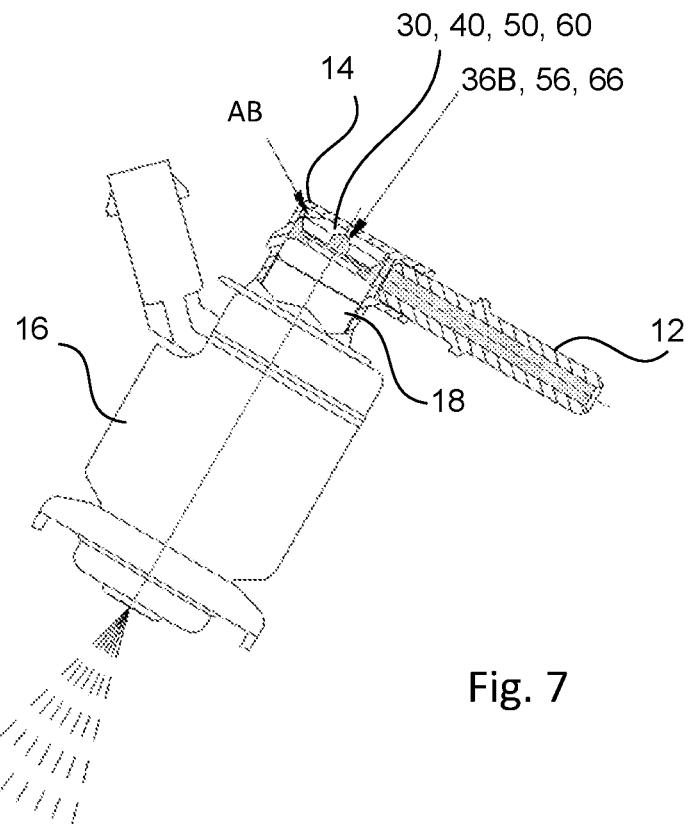
FIG. 7 illustrates a partial cross sectional view of an RDU having therein any of the RDU inserts of FIGS. 4A-4B, 5A-5B and 6A-6B, according to an example embodiment.
Figure 8:
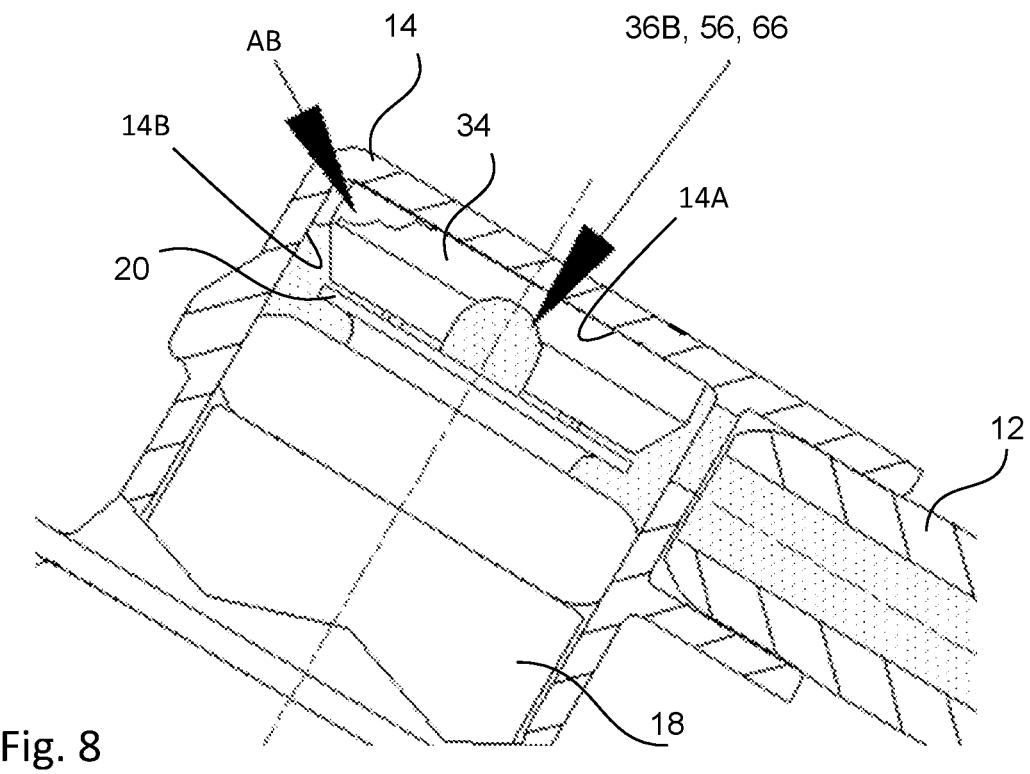
FIG. 8 is an expanded cross sectional view of a portion of the RDU of FIG. 7.

FIGS. 7 and 8 illustrate an RDU 100 having insert 30, 40, 50 or 60 (hereinafter, "insert 30-60") therein. RDU 100 is depicted at a 30 degree angle from vertical to represent an orientation when RDU 100 is mounted to a vehicle's exhaust pipe (not shown). As shown, first portion 32 of insert 30-60 is disposed within inlet tube 20 of injector 18, and second portion 34 is disposed between the top and/or upstream end of inlet tube 20 and an inner surface 14A of cup 14. The radial outer surfaces of second portion 34 are adjacent inner circumferential surface 14B of cup 14. In this way, insert 30-60, and particularly second portion 34 thereof, occupies a space within cap 14 which would otherwise be occupied by DEF and/or one or more air bubbles AB, thereby reducing the space which air bubble AB may occupy, which advantageous results in RDU 100 being less adversely affected by air bubble AB. As shown, air bubble AB is spaced from the fluid path of DEF from input tube 12, through or along groove 36 or channel 52, 62, and into injector 18, thereby reducing the effect of the air bubbles AB on RDU dosing performance. The reduced space also lessens the amount of DEF that is maintained in RDU 100 which would potentially freeze or which would need to be purged during a reductant purge operation. With insert 30-60 disposed within cup 14, DEF is able to flow from input tube 12 of RDU 100, through the groove(s) 36 or channel 52/62, and enter inlet tube 20 of injector 18. Once disposed in injector 18, the DEF is selectively discharged therefrom and into the vehicle exhaust pipe.

FIGS. 7 and 8 depict insert 30-60 oriented within cup 14 so that a groove 36, 56, 66 so that the groove in second portion 34 extend in a direction that is orthogonal or nearly orthogonal to a direction of flow of DEF exiting input tube 12 and entering cup 14. As a result, a DEF fluid path from input tube 12 into injector 18 passes circumferentially around second portion 34 before entering groove 36, 56, 66. It is understood that insert 30-60 may be oriented differently within cup 14 so as to change the amount of travel of DEF around second portion 34 before entering groove 36, 56, 66.

Figure 9A:
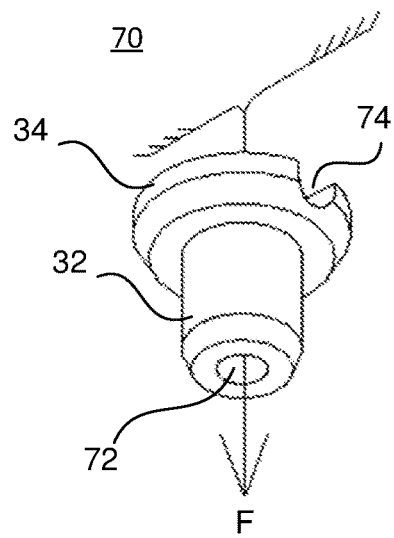
FIGS. 9A, 9B and 9C illustrate top perspective, cross sectional and bottom perspective views, respectively, of an RDU insert according to another example embodiment.
Figure 9B:
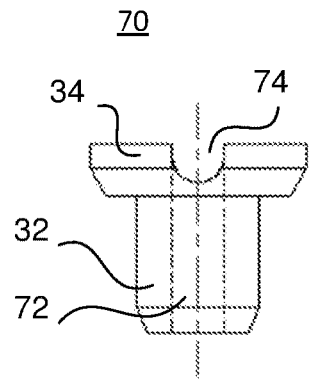
Figure 9C:
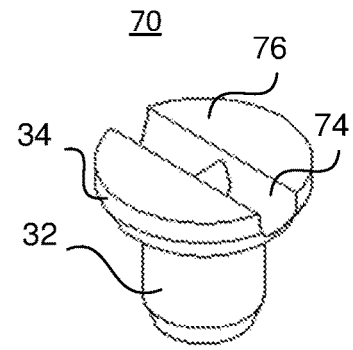

FIGS. 9A-9C depict an insert 70 according to yet another example embodiment. Similar to inserts 30-60, insert 70 includes first portion 32 which is sized and cylindrically shaped for insertion within inlet tube 20 of injector 18; and second portion 34 which extends from first portion 34 and is sized and dimensioned for being located above and/or upstream of inlet tube 20 of fluid injector 18 when insert 70 is disposed within an RDU. Also similar to inserts 50 and 60, first portion 32 includes a channel or throughbore 72 defined axially through first portion 32, along the longitudinal axis and/or axial center thereof. However, insert 70 differs from inserts 50 and 60 by second portion 34 including a groove or slot 74. Groove 74 is defined in and along the top surface 76 of insert 70. In this example embodiment, groove 74 extends diametrically across top 76 and is in fluid communication with channel 72. In this way, channel 72 and groove 74 together at least partly provide a fluid passage for DEF to pass from input tube 12 of the RDU to the RDU injector, as shown in greater detail below.

Figure 10A:
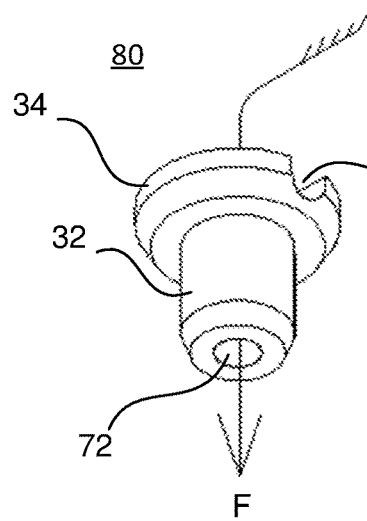
FIGS. 10A, 10B and 10C illustrate top perspective, cross sectional and bottom perspective views, respectively, of an RDU insert according to another example embodiment.
Figure 10B:
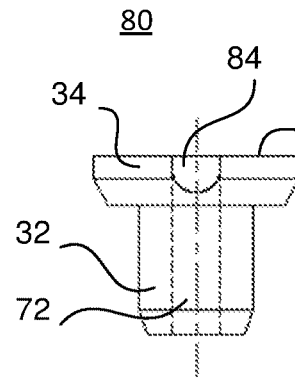
Figure 10C:
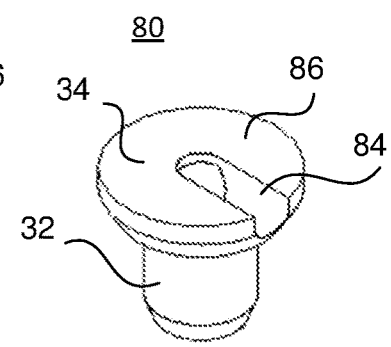

FIGS. 10A-10C show an insert 80 according to another example embodiment. Insert 80 resembles and includes many features of insert 70 as described above, with first portion 32, second portion 34 and channel 72. However, whereas insert 70 includes groove 74 which extends diametrically across top surface 76 of second portion 34, insert 80 includes a groove 84 which is defined in second portion 34 and disposed from a center portion thereof to a radial side surface of second portion 34. Channel 72 extends to groove 84 so that channel 72 and groove 84 are in fluid communication with each other and together at least partly provide a fluid passage for DEF to pass from input tube 12 of the corresponding RDU to the RDU injector.

Figure 11:
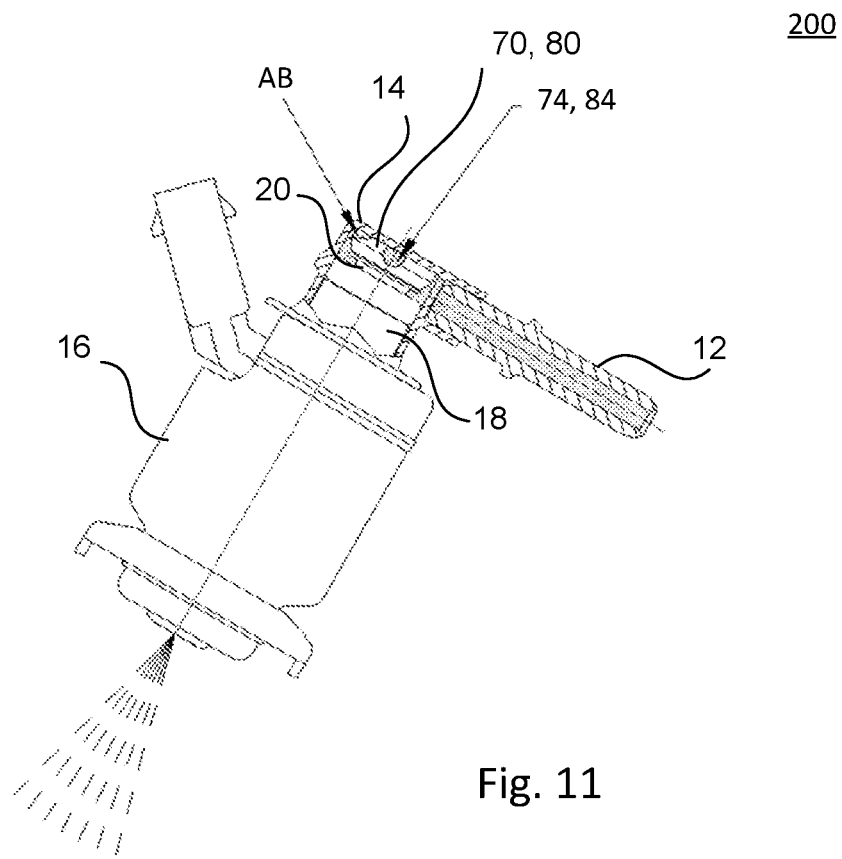
FIG. 11 illustrates a partial cross sectional view of an RDU having therein any of the RDU inserts of FIGS. 9A-9C and FIGS. 10A-10C, according to another example embodiment.
Figure 12:
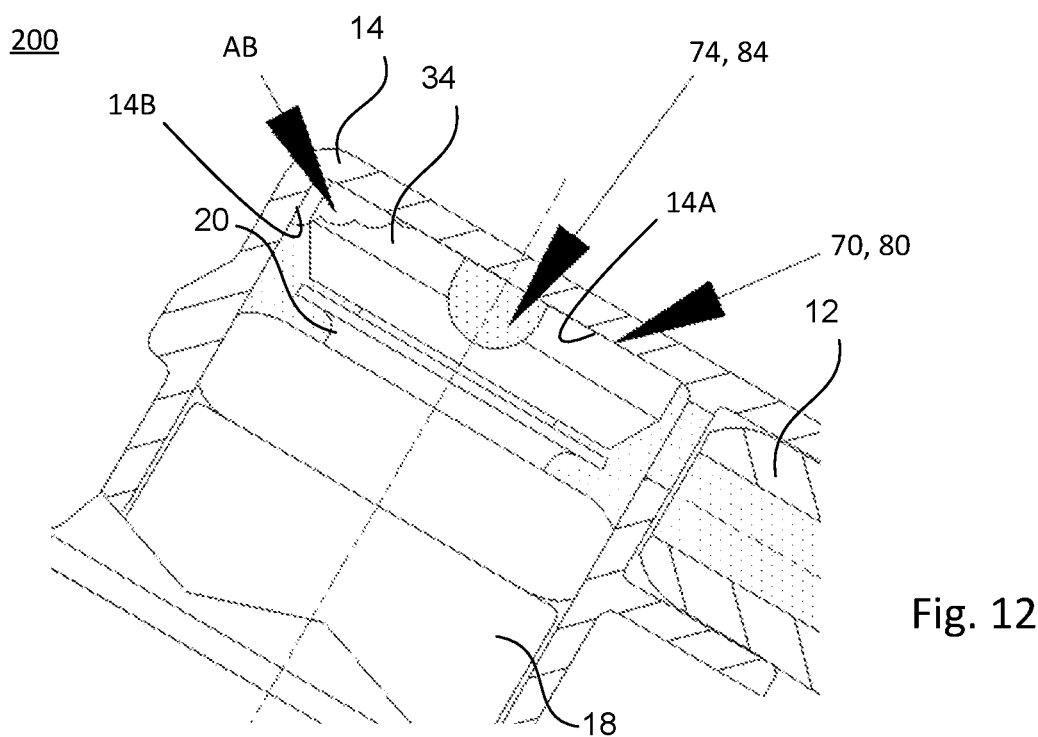
FIG. 12 illustrates an expanded cross sectional view of a portion of the RDU of FIG. 11.

FIGS. 11 and 12 illustrate RDU 200 according to additional example embodiments. RDU 200 includes fluid injector 18, RDU housing 16, input tube 12 and cup 14 as described above. In addition, RDU 200 includes insert 70 in one embodiment, and insert 80 in another embodiment. As shown, insert 70, 80 is partly inserted into the top (upstream) end of inlet tube 20 of injector 18, with first portion 32 being entirely or nearly entirely disposed therein and second portion 34 extending from the top of inlet tube 20.

RDU 200 is depicted in FIGS. 11 and 12 at a 30 degree angle from vertical to represent a potential orientation when RDU 200 is mounted to a vehicle's exhaust pipe (not shown). As shown, first portion 32 of insert 70, 80 is disposed within inlet tube 20 of injector 18, and second portion 34 is disposed between the top and/or upstream end of inlet tube 20 and inner surface 14A of cup 14. The radial outer side surfaces of second portion 34 are adjacent inner surface 14B of cup 14. In this way, insert 70, 80, and particularly second portion 34 thereof, occupies a space within cap 14 which would otherwise be occupied by DEF and/or one or more air bubbles or air pocket AB. As shown, air pocket AB is spaced from the fluid path of DEF from input tube 12, through or along groove 74, 84 and channel 72, and into injector 18, thereby reducing the effect of the air pocket AB on RDU dosing performance. The reduced space for DEF and air pockets also lessens the amount of DEF that is maintained in RDU 200 which would potentially freeze or which would need to be purged during a reductant purge operation. With insert 70, 80 disposed within cup 14, DEF is able to flow from input tube 12 of RDU 200, through the groove 74, 84 and channel 72, and enter inlet tube 20 of injector 18. Once disposed in injector 18, the DEF is selectively discharged therefrom and into the vehicle exhaust pipe.

Best seen in FIG. 12, insert 70, 80 is positioned within cup 14 such that groove 74, 84, together with the inner surface 14A of cup 14 immediately above groove 74, 84, form part of the fluid passage through insert 70, 80 and the DEF fluid path through cup 14.

With continued reference to FIG. 12, insert 70, 80 is oriented within cup 14 so that groove 74, 84 is positioned in a generally orthogonal direction relative to the direction of the flow of DEF exiting input tube 12 and entering cup 14. As a result, the DEF flow path from input tube 12 to inlet tube 20 of fluid injector 18 includes DEF flowing partly circumferentially around second portion 34 before entering groove 74, 84. It is understood that insert 70, 80 may be disposed within cup 14 so that groove 74, 84 is oriented at any of a number of different angles relative to the direction of DEF flow exiting input tube 12, thereby changing the amount of travel of DEF circumferentially around second portion 34 of insert 70, 80 before entering groove 74, 84.

Figure 13:
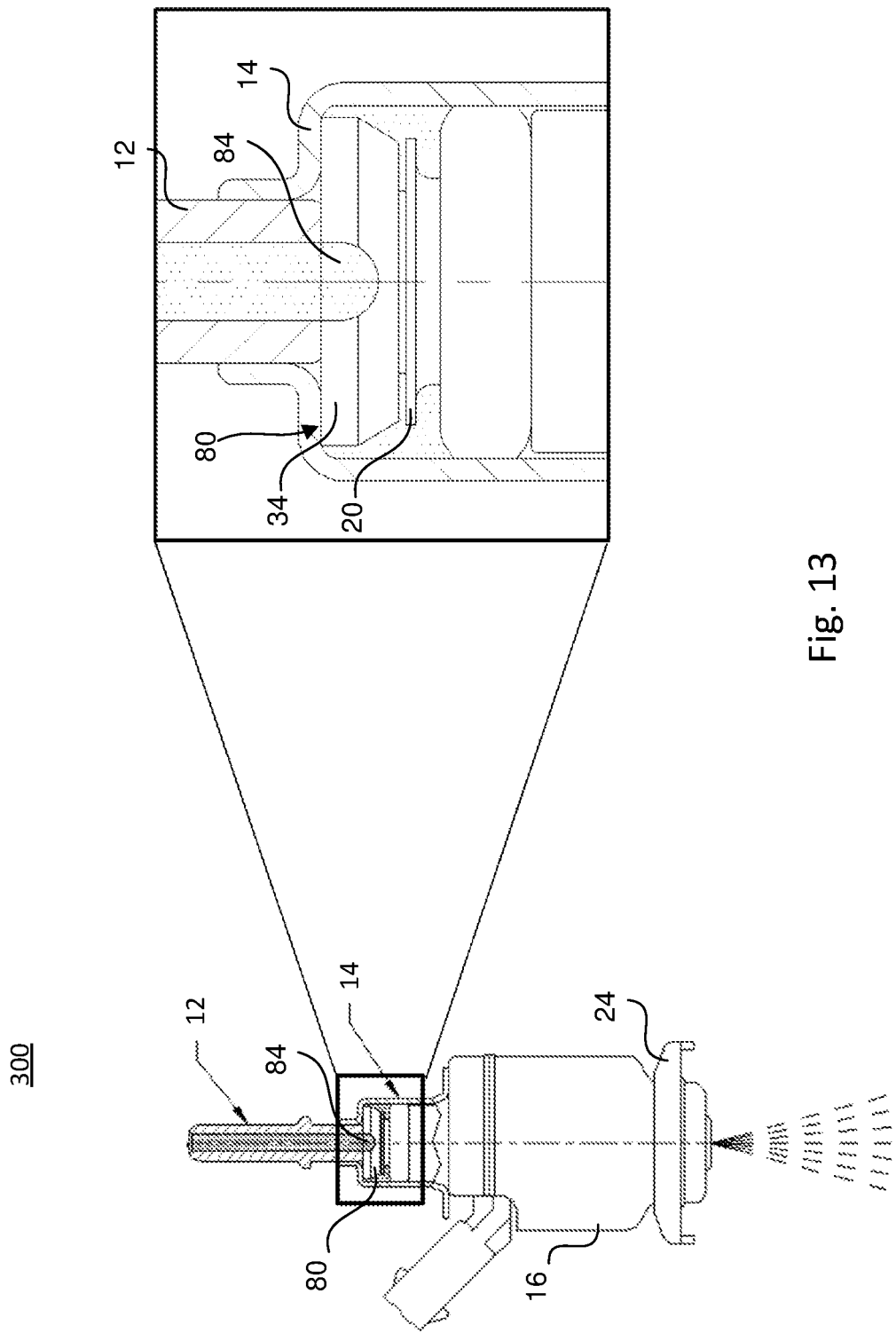
FIG. 13 illustrates a cross sectional view of an RDU according to another example embodiment.

FIG. 13 illustrates RDU 300 according to another example embodiment. RDU 300 resembles RDUs 100 and 200 as described above, with a fluid injector 18, input tube 12, cup 14, housing 16 and mounting flange 24. However, whereas RDUs 100 and 200 are side-feed RDUs having input tube 12 disposed at an angle, such as a right angle, relative to the longitudinal axis of fluid injector 18, RDU 300 is a top-feed RDU in which the longitudinal axis of input tube 12 is coaxial or nearly coaxial with the longitudinal axis of fluid injector 18. RDU 300 further includes either insert 70 or 80 disposed in cup 14. In RDU 300, DEF entering cup 14 from input tube 12 flows into groove 74, 84 before entering inlet tube 20 of injector 18.

The inserts described above address air pockets in the corresponding RDUs in a number of ways. First, the space in which an air pocket may be formed is reduced due to the presence of one of the above-described inserts within the RDU. This results in air pockets, if formed in cup 14, being reduced in size. In addition, larger open spaces in the RDUs are seen to cause DEF to drop back into the fluid injector 18 during a purge operation rather than being removed from the injector. By maintaining smaller open space within cup 14, more DEF is removed during a purge operation, with less DEF remaining thereafter to expand when frozen and potentially damage injector 18.

Figure 14:
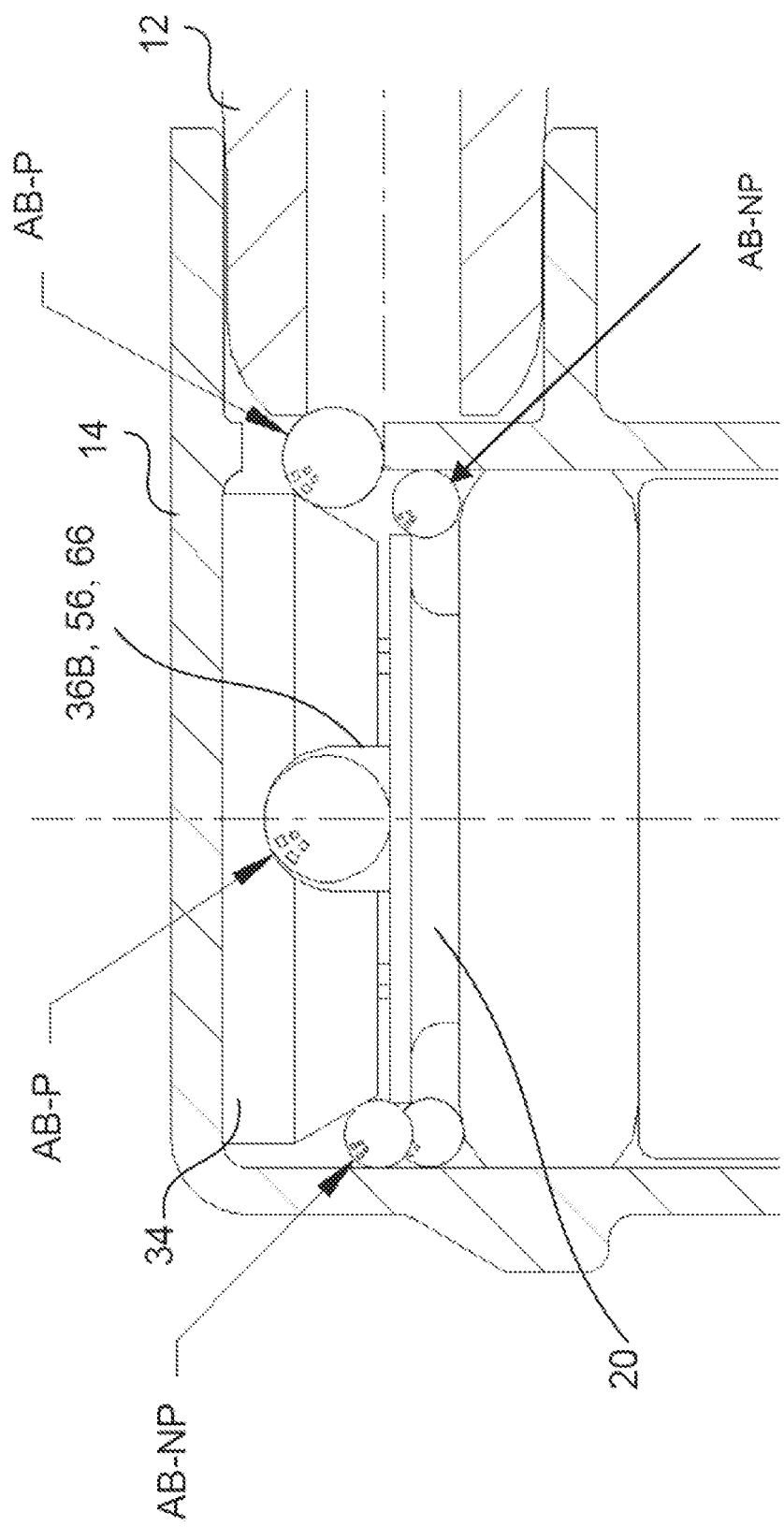
FIG. 14 illustrates a cross sectional view of the RDU of FIG. 8 having air bubbles and/or pockets therein.

Second, open volumes in cup 14 are smaller than the size of the fluid path of RDUs 100, 200, 300, and particularly the size of the fluid passage(s) at least partly defined by the inserts. Given that air pockets are typically composed of spherical air bubbles, air bubbles in cup 14 which are not in the RDU fluid path in cup 14 are smaller than air bubbles which are in the fluid passages of the inserts and/or the RDU fluid path. FIG. 14 illustrates insert 30-60 disposed in RDU 100, with air bubble AB-P located in the fluid passage of insert 30-60, and smaller air bubbles AB-NP which are not in the fluid passage of insert 30-60 or in the DEF fluid path through cup 14. Sizing insert 30-60 relative to cup 14 so that that the DEF fluid path through cup 14 is sized larger than spaces within cup 14 which are not in the DEF fluid path, resulting in air bubbles NP which are not in the DEF fluid path being smaller than the dimensions of the fluid path, helps to ensure that all of the air bubbles P and NP preferentially pass through injector 18 during priming.

It is understood that injector 18 may include parts and components conventionally found in fluid injectors and particularly RDU injectors, including an actuator unit (not shown) having a coil, movable armature and pole piece; a valve assembly (not shown) having a valve needle and valve seat; and an electrical connector configured to receive one or more electrical signals for controlling the valve assembly via the actuator unit. Injector 18 may include parts, components and features shown in US patent publ. 2015/0115051A, the content of which is incorporated by reference herein in its entirety.

Inserts 30, 40, 50, 60, 70 and 80 may be constructed from any of a number of different materials which is capable of withstanding temperatures above the normal RDU operating range and withstanding exposure to DEF. For example, inserts 30-80 may be constructed from a plastic composition. Alternatively, inserts 30-80 may be constructed from metal. In another alternative embodiment, insert 30, 40, 50, 60, 70, 80 is integrally formed with cup 14 as a unitary member. In particular, the insert and cup 14 may be constructed from a metal, and formed from a metal injection molding process.

Inserts 30, 40, 50, 60, 70 and 80 are described above as being part of an RDU. It is understood that such inserts may also be used in other injector-based devices, such as a diesel dosing unit.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A dosing unit, comprising:
    a fluid injector having an inlet tube, a nozzle and an injector fluid path from the inlet tube to the nozzle, the injector fluid path being part of a fluid path of the dosing unit;
    an inlet cup sized and shaped for receiving therein at least part of the inlet tube of the fluid injector, the inlet cup including a fluid inlet;
    an input tube in fluid communication with the inlet cup via the fluid inlet thereof, the input tube configured to receive fluid from a fluid source; and
    an insert partly disposed in the inlet tube of the fluid injector, the insert at least partly defining a fluid passage, the fluid passage being in fluid communication with the input tube and the inlet tube of the fluid injector and forming part of the fluid path of the dosing unit, the fluid passage comprising at least one groove extending in a direction that is orthogonal to a longitudinal axis of the fluid injector, the at least one groove extending to an outer most radial side surface of the insert.

2. The dosing unit of claim 1, wherein the at least one groove is defined along an outer surface of the insert.

3. The dosing unit of claim 2, wherein the fluid passage of the insert further includes a channel defined in the insert, the at least one groove and the channel being in fluid communication.

4. The dosing unit of claim 3, wherein the insert includes a first portion at least partly disposed within the inlet tube of the fluid injector and a second portion attached to the first portion and extending from the inlet tube.

5. The dosing unit of claim 4, wherein the channel is defined in at least the first portion and the at least one groove is defined in the second portion.

6. The dosing unit of claim 5, wherein the second portion comprises a first outer surface that is a top surface of the insert, and the at least one groove is defined along the first outer surface.

7. The dosing unit of claim 6, wherein the second portion further comprises at least one circumferential surface, and the at least one groove is defined along the first outer surface from a center portion of first outer surface to a first location along the circumferential surface.

8. The dosing unit of claim 6, wherein the second portion further comprises at least one circumferential surface, and the at least one groove is defined along the first outer surface from a center portion of first outer surface to at least first and second locations along the circumferential surface.

9. The dosing unit of claim 1, wherein the dosing unit is a side feed dosing unit and the fluid path of the dosing unit passes at least partly circumferentially around the insert.

10. The dosing unit of claim 1, wherein the inlet cup and the insert are integrally formed as a unitary member.

11. The dosing unit of claim 1, wherein the dosing unit is a side feed dosing unit configured to be positioned at a nonzero angle from a longitudinal axis of the dosing unit, and the insert is sized relative to the inlet cup so that an air bubble formable within the cup is spaced from the fluid path of the dosing unit.

12. The dosing unit of claim 1, wherein the insert is sized relative to the inlet cup so as to define a first space in the inlet cup that is not occupied by the fluid injector, the insert and the input tube and that is not in the fluid path of the dosing unit, and wherein dimensions of the fluid path within the inlet cup are larger than dimensions of the first space.

13. A dosing unit, comprising:
    a fluid injector having an inlet tube, a nozzle and an injector fluid path from the inlet tube to the nozzle, the injector fluid path being part of a fluid path of the dosing unit;
    an inlet cup sized and shaped for receiving therein at least part of the inlet tube of the fluid injector, the inlet cup including a fluid inlet;
    an input tube in fluid communication with the inlet cup via the fluid inlet thereof, the input tube configured to receive fluid from a fluid source; and
    an insert partly disposed in the inlet tube of the fluid injector, the insert at least partly defining a fluid passage, the fluid passage being in fluid communication with the input tube and the inlet tube of the fluid injector and forming part of the fluid path of the dosing unit,
    wherein the insert includes at least one groove defined at least partly along an outer surface of the insert and at least partly defining the fluid passage, the at least one groove extending to an outer most radial side surface of the insert.

14. The dosing unit of claim 13, wherein the at least one groove comprises a plurality of grooves, each groove defined at least partly along the outer surface of the insert.

15. The dosing unit of claim 13, wherein the insert includes at least one channel defined within the insert, the at least one channel and the at least one groove at least partly defining the fluid passage.

16. The dosing unit of claim 15, wherein the fluid passage includes a portion extending in a direction that is orthogonal to a longitudinal axis of the fluid injector.

17. The dosing unit of claim 15, wherein the insert includes a first portion at least partly disposed within the inlet tube of the fluid injector and a second portion attached to the first portion and extending from the inlet tube.

18. The dosing unit of claim 17, wherein the at least one channel is defined in at least the first portion and the at least one groove is defined in the second portion.

19. The dosing unit of claim 18, wherein the at least one groove is defined along one of an axial surface and a radial surface of the second portion.

20. The dosing unit of claim 13, wherein the dosing unit is a side feed dosing unit and the fluid path of the dosing unit passes at least partly circumferentially around the insert.

* * * * *